July 4, 1939.  C. SCHLUMBERGER  2,165,013
METHOD AND APPARATUS FOR IDENTIFYING THE NATURE
OF THE FORMATIONS IN A BORE HOLE
Original Filed Sept. 10, 1934
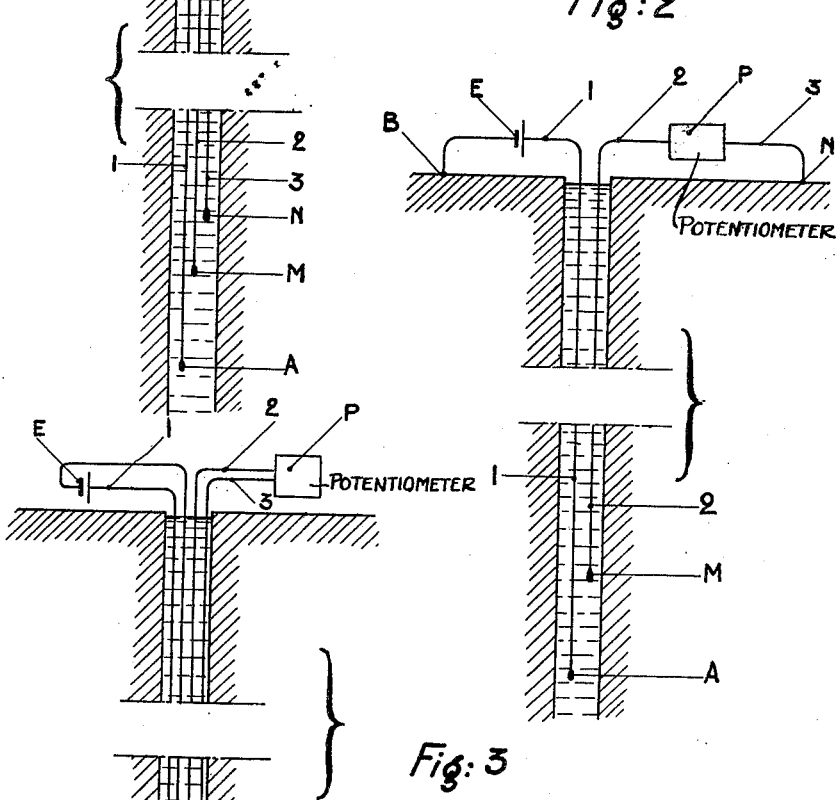
Inventor:
Conrad Schlumberger

# UNITED STATES PATENT OFFICE 2,165,013

METHOD AND APPARATUS FOR IDENTIFYING THE NATURE OF THE FORMATIONS IN A BORE HOLE

Conrad Schlumberger, Paris, France, assignor, by mesne assignments, to Schlumberger Well Surveying Corporation, Houston, Tex., a corporation of Delaware Application September 10, 1934, Serial No. 743,479. Renewed July 16, 1938. In France October 3, 1933

8 Claims. (Cl. 175—182)

The electrical surveying of a bore hole, which is known generally under the name of "electrical coring", consists in determining by means of electrical measurements taken within the hole in the open part where there is no casing, the nature of the formations traversed by this bore hole. Electrical coring comprises at the present time the two following operations. On the one hand one measures the specific electric resistivity of the rocks, the physical quantity which characterises the lithological nature of these rocks (see U. S. patent specification No. 1,819,923) and on the other hand one measures in the hole, previously filled with water or drilling mud, the potentials spontaneously generated under the effect of the phenomena of electro-filtration and electro-osmosis; these spontaneous potentials make it possible to ascertain the depth at which the porous beds are located and also their thickness (see U. S. patent specification No. 1,913,293).

The applicant has discovered that in the electrical surveying of bore holes there is a third electrical quantity which can be easily measured and which gives important supplementary information regarding the rocks forming the wall of the hole. This third quantity is constituted by the "residual" potentials, that is to say the potentials which persist for a short time in the water filling the bore hole immediately after the cessation of a direct current which has been passed through it. This is in fact a phenomenon of polarization and it appears to be due to a certain electrical capacity of the rock forming the wall of the hole. By means of this capacity the rock first stores under the action of the current a certain quantity of electricity. It gives back this electricity as a discharge current passing through the water of the hole, and the residual potentials are thus produced.

The present invention consists in the creation of these "residual" potentials and in using them to determine the nature of the formations traversed by the bore hole. A description will now be given (without entering into a theoretical discussion of the phenomenon) how the "residual" potentials in question are produced inside a bore hole, how their measurements are carried out and how such measurements are put to use, in accordance with the present invention. However it should be understood that said phenomena of residual potentials appear to be not influenced by the phenomenon known as "transient", which occurs as well by closing as by cutting off a circuit of current. As a matter of fact, in the conditions existing in a bore hole, the duration of the transient is far shorter than that of the residual potentials; and therefore no special care need be taken for eliminating the transient in measuring the residual potentials. The duration of the residual potentials is of about one or two seconds, and, for a certain portion of said time, the residual potentials do not vary appreciably. The measurement should therefore be taken a short time (e. g. $\tfrac{1}{10}$ sec.) after cutting off the current and should only extend through that interval of time wherein the residual potentials are practically constant (i. e. approximately $\tfrac{1}{10}$ sec.)

The accompanying drawing relates to different ways of carrying out the process and shows, diagrammatically, apparatus for these purposes. In the drawing:

Figure 1 shows apparatus for carrying out the invention in one manner,

Figure 2 shows apparatus for a second manner, and

Figure 3 for a third.

For the purpose of the first method of carrying out the invention the apparatus shown in Figure 1 is used. The bore hole in its uncased portion is previously filled with water and into it are lowered three electrodes A, M and N located one above the other at a short distance apart and held at constant distances from each other, just as in the case of measuring the resistivity of the rocks by the method described in U. S. patent application No. 1,819,923. The electrode A is connected by an insulated cable 1 to one of the terminals of a source of current E located at the surface, the other pole of which is connected to the ground at a fixed point B, which may for instance be at the surface. Thus, from the electrode A immersed in the water a certain current flows, which after being diffused in the ground returns to the source E by passing through the ground connection B. This current produces in the ground in accordance with Ohm's law potential differences, which are measured by means of the two other electrodes M and N. For this purpose these two electrodes are connected by two insulated cables 2 and 3 to the two terminals of a potentiometer P at the surface. This potentiometer makes it possible to measure the difference of potential $\Delta V$ which appears between M and N when current is sent into the ground.

When the current supplied by A is suppressed by opening the circuit near E, there remains between M and N for a short time a certain residual difference of potential $\Delta V'$; the latter diminishes rapidly, and completely disappears after one or two seconds. It has been ascertained that this residual difference of potential ΔV' is:

(1) Of the same sign as the ohmic difference of potential ΔV;

(2) Proportional for a given position of the electrodes A, M and N in the bore hole to the intensity of the current which is passed through the electrode A, and consequently also proportional to ΔV;

(3) Dependent upon the nature of the rock surrounding the three electrodes.

Taking all these facts into account the ratio $$\frac{\Delta V'}{\Delta V}$$

of the residual potential difference to the ohmic potential difference has a definite fixed value at any given depth in the bore hole; this ratio however varies as the set of three electrodes is moved along the bore hole and as accordingly the nature of the formation located around the electrodes is varied. It is thus possible to trace a graph which gives for the various depths the value of the quantity $$\frac{\Delta V'}{\Delta V}$$

It has been found by experience that this graph makes it possible to determine with sufficient fidelity the nature of the various rocks traversed by the bore hole. For example when two such graphs are prepared from two neighbouring bore holes traversing the same geological formations, the parallelism of these graphs will be noted. This makes it possible to determine the variations of depth or thickness of any one bed taken as a reference, for example that of one bed of sand, when passing from one bore hole to the other.

The applicant has observed that the different rocks which may constitute the wall of a bore hole give different coefficients $$\frac{\Delta V'}{\Delta V}$$

varying for example from one hundredth to ten hundredths. The coefficient of clays is particularly low, that of water-bearing sands and sandstones is the largest. The nature of the liquid impregnating a sand plays some part. Thus an oil-bearing sand is distinguished from a water-bearing sand by a lower value of its coefficient. These indications show that beyond the correlation between neighbouring bore holes by means of simple comparison of their respective graphs, these graphs also give a diagnosis regarding the lithological character of the rocks, particularly for recognising whether a bed of sand is water-bearing or oil-bearing.

The method of measurement which is preferable is the following: the three electrodes are set at distances bearing a suitable relation to the diameter of the hole and to the thickness of the beds to be studied. These distances may vary from a few decimetres to several metres. For measuring the ohmic difference of potential ΔV it is sufficient to take this measurement during the passage of current, as is usual when measuring the resistivity. To obtain the residual difference of potential ΔV' which, being a transitory phenomenon, must be measured a short time (f. i. $\frac{1}{10}$ sec.) after the cessation of the current, it is convenient to operate by means of a double rotary commutator 4, 5 at the surface, acting synchronously on the two circuits in which the source of current E and the potentiometer P are respectively connected. This commutator, as shown in Figure 1 with the motor 6 driving it, comprises two separate contact arrangements 4 and 5 insulated from each other, and each provided with a pair of brushes 4a, 4b, and 5a, 5b. It may be driven for example at a speed of 5 revolutions per second so that the current i is allowed to pass for half a period, that is $\frac{1}{10}$ of a second, and is then interrupted for the next half period. The commutator acts in a similar way on the potentiometer P, which is put into circuit when the current is interrupted and cut out when the current flows. With these connections the potentiometer is affected only by the residual potentials and so measures them correctly.

The addition to such apparatus of recording devices of any known type makes it possible to trace easily and in a continuous manner the two graphs of ΔV and ΔV' as the set of three electrodes A, M and N is moved along the length of the bore hole. The surveying of a bore hole can thus be carried out very rapidly even over a wide range of depths.

Of course, since the residual potentials always constitute only a small fraction of the ohmic potential, all the usual precautions must be taken to obviate errors which might be caused by insulation defects or mutual induction between the current and measuring circuits or even by the capacity of the electric cables. For instance, provision may be made for compensating any eventually existing parasitic potential differences.

Instead of lowering into the bore hole an arrangement comprising three electrodes A, M and N, the arrangement shown in Figure 2 may be used, which comprises only two electrodes A and M for lowering into the bore hole. The electrode N, by which the potentiometer circuit is connected to the ground, is then kept at a fixed location, which may for example be at the surface of the ground. In this arrangement the measurement of both ohmic and residual potentials is carried out between the electrodes M and N which are very far apart. It might be thought that in these conditions the measurement would relate to a large volume of soil and would lose its well defined local character at any given depth in the bore hole. Fears of such a disadvantage are, however, not realised. The drop of potential occurs almost entirely in the immediate neighbourhood of the two current supply electrodes A and B, because it is only there that there is any high current density. Thus it is sufficient for the electrode M to be near the electrode A, and the electrode N may be placed at a great distance from the electrodes A and B at any suitable point in the ground, where it gives practically the value of the potential at infinity.

A third method is shown in Figure 3, which may also be used. In this case all the four electrodes A, B, M and N are lowered simultaneously into the hole but their relative distances are maintained constant. The current still passes into the ground between A and B and the measurement of potentials is carried out between M and N. In this case the current terminals A and B both contribute in creating potential differences between M and N, which actually doubles the residual and ohmic potential differences to be measured if the electrodes M and N are placed symmetrically with reference to the electrodes A and B. There are however certain practical disadvantages in this method, particularly the necessity of the immersion in the bore hole of four insulated conductors instead of the two or three required by the previous described methods.

It should be explained that in Figures 2 and 3 the commutator and its brushes are omitted for the sake of simplicity. These, however, will be connected in exactly the same manner as is shown in Figure 1.

Whatever may be the arrangement adapted for the electrodes the method of the present invention always yields in practice the ratio between the residual and ohmic potential differences measured between the same two electrodes immersed in the water and therefrom a graph of the various values assumed by this ratio as the set is moved along the length of the bore hole.

What I claim is:

1. The method of identifying the nature of the formations traversed by a bore hole containing water or mud, particularly for distinguishing water-bearing and oil-bearing beds, which method comprises the steps of passing an electric current at various given depths in the bore hole into the water or mud contained therein, cutting off said current for generating a residual potential difference in the neighboring soil, and measuring the said residual potential difference at various depths in the bore hole, from which measurements may be deduced the nature of the formations traversed by the bore hole at the said various depths.

2. The method of identifying the nature of the formations traversed by a bore hole containing water or mud, particularly for distinguishing water-bearing and oil-bearing beds, which method comprises the steps of lowering to various depths in the bore hole three electrodes located at fixed distances apart and connected to conducting leads, passing into the ground at said various given depths by one of said electrodes an electric current from a source of current having one terminal connected to the said electrode and the other to a stationary ground connection, cutting off said current for generating a residual potential difference in the neighboring ground, measuring between the other two electrodes in the bore hole the potential differences due to the flow of current in the ground, first during the passage of current and then a short time after cessation of the said current and of the transient current induced in the water or mud and in the neighboring soil by the cessation of said current, and computing the ratio of the two values so obtained, which constitutes a coefficient characteristic of the nature of the formations at the depths in question.

3. The method of identifying the nature of the formations traversed by a bore hole containing water or mud, particularly for distinguishing water-bearing and oil-bearing beds, which method comprises the steps of lowering to various known depths in the bore hole two electrodes located at a fixed distance apart and connected to conducting leads, passing into the ground at said various known depths by one of said electrodes an electric current from a source of current having one terminal connected to the said electrode and the other to a stationary ground connection, cutting off said current for generating residual potential differences in the neighboring ground, measuring between the second of the two electrodes lowered into the bore hole and another stationary electrode connected to the ground at a point remote from the aforementioned stationary ground connection, the potential differences due to the flow of current in the ground, first during the passage of current and then a short time after cessation of the said current and of the transient current induced in the water or mud and in the neighboring soil by the cessation of said current, and computing the ratio of the two values so obtained, which constitutes a coefficient characteristic of the nature of the formations at the depths in question.

4. The method of identifying the nature of the formations traversed by a bore hole containing water or mud, particularly for distinguishing water-bearing and oil-bearing beds, which method comprises the steps of lowering to various known depths in the bore hole four electrodes located at fixed distances apart and connected to conducting leads, passing into the ground by two of these electrodes an electric current from a source of current having its terminals connected to the said two electrodes, measuring between the other two electrodes lowered into the bore hole, the potential differences due to the flow of current in the ground, first during the passage of current and then a short time after cessation of the said current and of the transient current induced in the water or mud and in the neighboring soil by the cessation of said current, and computing the ratio of the two values so obtained, which constitutes a coefficient characteristic of the nature of the rocks at the depths in question.

5. Apparatus for producing a residual potential difference at various depths in a bore hole filled with water or mud and for measuring this residual potential for the purpose of deducing therefrom the nature of the formations at these various depths, comprising in combination four electrodes, conducting leads connected to the said electrodes, a source of direct current connected to two of the electrodes by a direct current circuit, a potentiometer connected to the other two electrodes by a potentiometric circuit, and a double rotary commutator closing and opening first the direct current circuit and then the potentiometric circuit, this latter being closed only after the cessation of the direct current and of the induced currents and being opened prior to the sending of the direct current.

6. A method for identifying the nature of the formations traversed by a bore hole which comprises the steps of flowing a current in the bore hole and measuring the amount of electrical polarization resulting therefrom.

7. A method for identifying the nature of the formations traversed by a bore hole which comprises the steps of creating residual potential differences in the bore hole at various given depths and measuring said differences.

8. A method for identifying the nature of the formations traversed by a bore hole which comprises the steps of creating periodically residual potential differences in the bore hole at various given depths and measuring said differences.

CONRAD SCHLUMBERGER.